(12) United States Patent
Lin

(10) Patent No.: US 7,696,703 B2
(45) Date of Patent: Apr. 13, 2010

(54) DRIVING CIRCUIT FOR LIGHT-EMITTING DIODE

(75) Inventor: Jhy-Chain Lin, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 629 days.

(21) Appl. No.: 11/561,311

(22) Filed: Nov. 17, 2006

(65) Prior Publication Data

US 2008/0012802 A1    Jan. 17, 2008

(30) Foreign Application Priority Data

Jul. 12, 2006 (CN) .................. 2006 1 0061617

(51) Int. Cl.
   *G05F 1/00* (2006.01)
(52) U.S. Cl. .................. 315/291; 315/307; 315/209 R; 345/182
(58) Field of Classification Search .............. 315/291, 315/224, 307, 185 R, 312, 169.3, 209 R; 323/234; 345/102, 82, 84, 76–78
See application file for complete search history.

(56) References Cited

U.S. PATENT DOCUMENTS

| 6,844,760 | B2 | 1/2005 | Koharagi et al. |
| 7,206,015 | B2 * | 4/2007 | Tang et al. .................. 347/247 |
| 7,456,586 | B2 * | 11/2008 | Morejon ..................... 315/291 |
| 2004/0164685 | A1 * | 8/2004 | Dygert ........................ 315/224 |
| 2005/0225515 | A1 * | 10/2005 | Tsuchida et al. .............. 345/76 |

\* cited by examiner

*Primary Examiner*—Douglas W Owens
*Assistant Examiner*—Ephrem Alemu
(74) *Attorney, Agent, or Firm*—Clifford O. Chi

(57) ABSTRACT

An exemplary driving circuit for a light-emitting diode having a positive terminal includes a resistor having first terminal and second terminal, a field-effect transistor, and a width-pulse modulation circuit. The second terminal of the resistor is connected to the positive terminal of the light-emitting diode. The field-effect transistor includes a source electrode and a gate electrode, the source electrode being connected to the first terminal of the resistor. The pulse-width modulation circuit is configured for modulating a voltage across the resistor so as to control the grate electrode of the field-effect transistor.

20 Claims, 2 Drawing Sheets

DRIVING CIRCUIT FOR LIGHT-EMITTING DIODE

BACKGROUND

1. Technical Field

The present invention generally relates to driving circuits for light-emitting diodes, and more particularly to a driving circuit for light-emitting diodes that can adjust the current through the light-emitting diode.

2. Description of Related Art

A typical driving circuit for a light-emitting diode uses a voltage source and a current-limiting resistor connected in series to drive the light-emitting diode. The current through the light-emitting diode changes, accordingly, the voltage across the light-emitting diode changes. The voltage source is adjusted linearly, however, the current through the light-emitting diode changes nonlinearly. If the voltage across the light-emitting diode changes more, the current may exceed rated current of the light-emitting diode, resulting in the light-emitting diode being damaged.

What is needed, therefore, is a driving circuit for light-emitting diode that can adjust the current through the light-emitting diode.

SUMMARY

In an embodiment, a driving circuit for a light-emitting diode having a positive terminal includes a resistor having first and second terminals, a field-effect transistor, and a width-pulse modulation circuit. The second terminal of the resistor is connected to the positive terminal of the light-emitting diode. The field-effect transistor includes a source electrode and a gate electrode, the source electrode being connected to the first terminal of the resistor. The pulse-width modulation circuit is configured for modulating voltage across the resistor so as to control the grate electrode of the field-effect transistor.

Other advantages and novel features will become more apparent from the following detailed description of the present driving circuit for light-emitting diode when taken in conjunction with the accompanying drawings.

BRIEF DESCRIPTION OF THE DRAWINGS

Many aspects of the present driving circuit for light-emitting diode can be better understood with reference to the following drawings. The components in the drawings are not necessarily drawn to scale, the emphasis instead being placed upon clearly illustrating the principles of the present driving circuit. Moreover, in the drawings, like reference numerals designate corresponding parts throughout the several views.

DETAILED DESCRIPTION OF PREFERRED EMBODIMENTS

Figure 1:
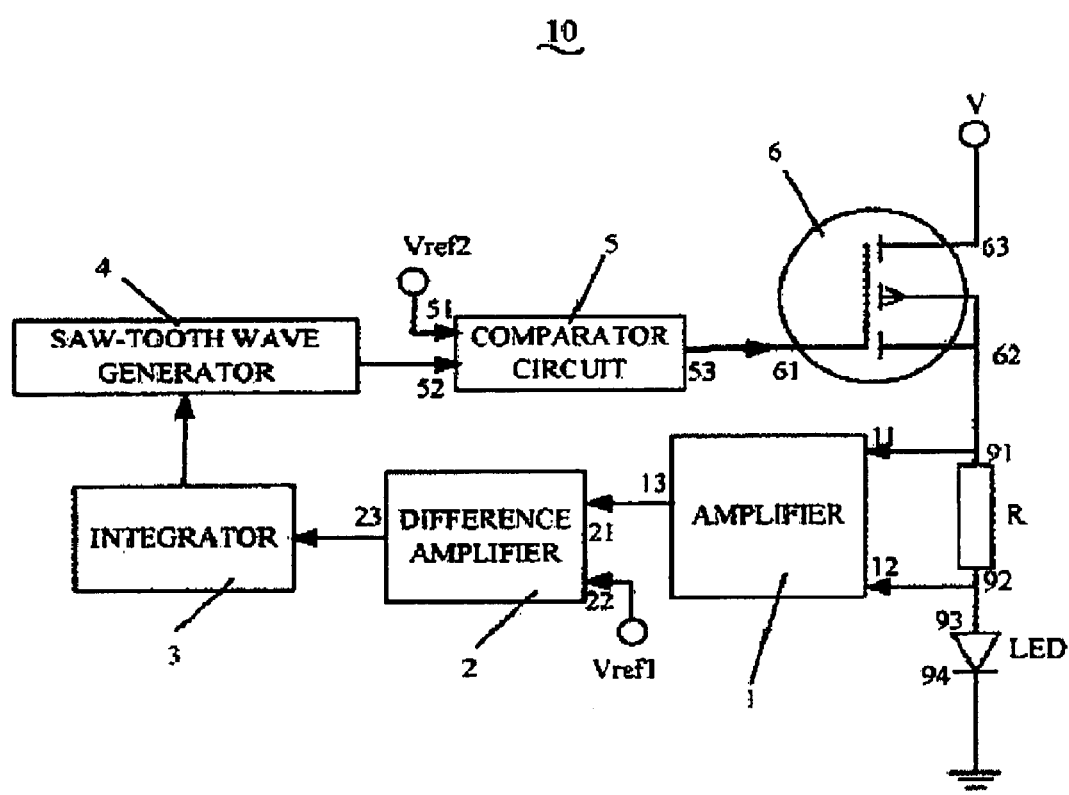
FIG. 1 is a schematic view of a driving circuit for light-emitting diode, in accordance with a first embodiment of the present invention.

Reference will now be made to the drawing figures to describe the preferred embodiments of the present driving circuit for light-emitting diode in detail.

Referring to FIG. 1, a driving circuit 10 for a light-emitting diode (LED) in accordance with a first embodiment is shown. The driving circuit 10 includes a resistor R connected with the LED, an amplifier 1, a difference amplifier 2, an integrator 3, a saw-tooth wave generator 4, a comparator 5, and a field-effect transistor 6.

The LED has a positive terminal 93 and a negative terminal 94. The field-effect transistor 6 includes a gate electrode 61, a source electrode 62, and a drain electrode 63. The resistor R includes a first terminal 91 and a second terminal 92, the first terminal 91 being connected to the source electrode 62 of the field-effect transistor 6 and the second terminal 92 being connected to the positive terminal 93 of the LED. The drain electrode 63 of the field-effect transistor 6 is connected to a positive voltage V. The negative terminal 94 of the LED is connected to ground. A voltage source is defined between the positive voltage V and ground. Electric current can flow through the drain electrode 63 and the source electrode 62 and flow to the LED through the resistor R.

The amplifier 1, the difference amplifier 2, the integrator 3, the saw-tooth wave generator 4, and the comparator circuit 5 are connected in series. The difference amplifier 2 includes first input terminal 21, second input terminal 22, and an output terminal 23. The comparator 5 includes first input terminal 51, second input terminal 52, and an output terminal 53.

The amplifier 1 is an integrated operational amplifier and is configured for amplifying a voltage across the resistor R. The amplifier 1 includes first input terminal 11, second input terminal 12, and an output terminal 13. The first input terminal 11 of the amplifier 1 is connected to the first terminal 91 of the resistor R and the second input terminal 12 is connected to the second terminal 92 of the resistor R.

The first input terminal 21 of the difference amplifier 2 is connected to the output terminal 13 of the amplifier 1 and the second input terminal 22 is connected to a first reference voltage Vref1, which can for example be a voltage signal. The difference amplifier 2 is configured for performing a differential operation between a voltage of the amplifier 1 and the first reference voltage Vref1 and a resulting differential voltage is output to the integrator 3 via the output terminal 23.

The differential voltage output by the difference amplifier 2 is undergoes integration in the integrator 3, and an integrated voltage is output to the saw-tooth wave generator 4. The saw-tooth wave generator 4 is a voltage-controlled element. The integrated voltage output by the integrator 3 is regarded as a control signal for the saw-tooth wave generator 4. A saw-tooth wave generated by the saw-tooth wave generator 4 is input into the comparator 5 via the first input terminal 51 and a second reference voltage Vref2 is input into the comparator 5 via the second input terminal 52. The saw-tooth wave is pulse-width modulated by the second reference voltage Vref2 in the comparator 5 and a pulse-width modulation signal is output to the gate electrode 61 of the field-effect transistor 6 via the output terminal 53.

The second reference voltage Vref2 is a constant voltage signal. When the saw-tooth wave generator 4 outputs different saw-tooth waves to the comparator 5, the comparator 5 can generate different duty-cycle pulse signals.

The pulse signal output by the comparator 5 controls the gate electrode 61 of the field-effect transistor 6 so as to control activation and deactivation of the field-effect transistor 6. The result is that a current through the LED is changeable. The field-effect transistor 6 can be a P-N-P type transistor.

When the voltage of the resistor R increases, the current through the LED increases, the result is that the saw-tooth wave generator 4 outputs a large period saw-tooth wave. Therefore, the comparator 5 generates a large duty-cycle pulse signal to control the P-N-P type field-effect transistor 6.

The result is that the current through the LED decreases. Thus, the current through the LED is adjusted.

Figure 2:
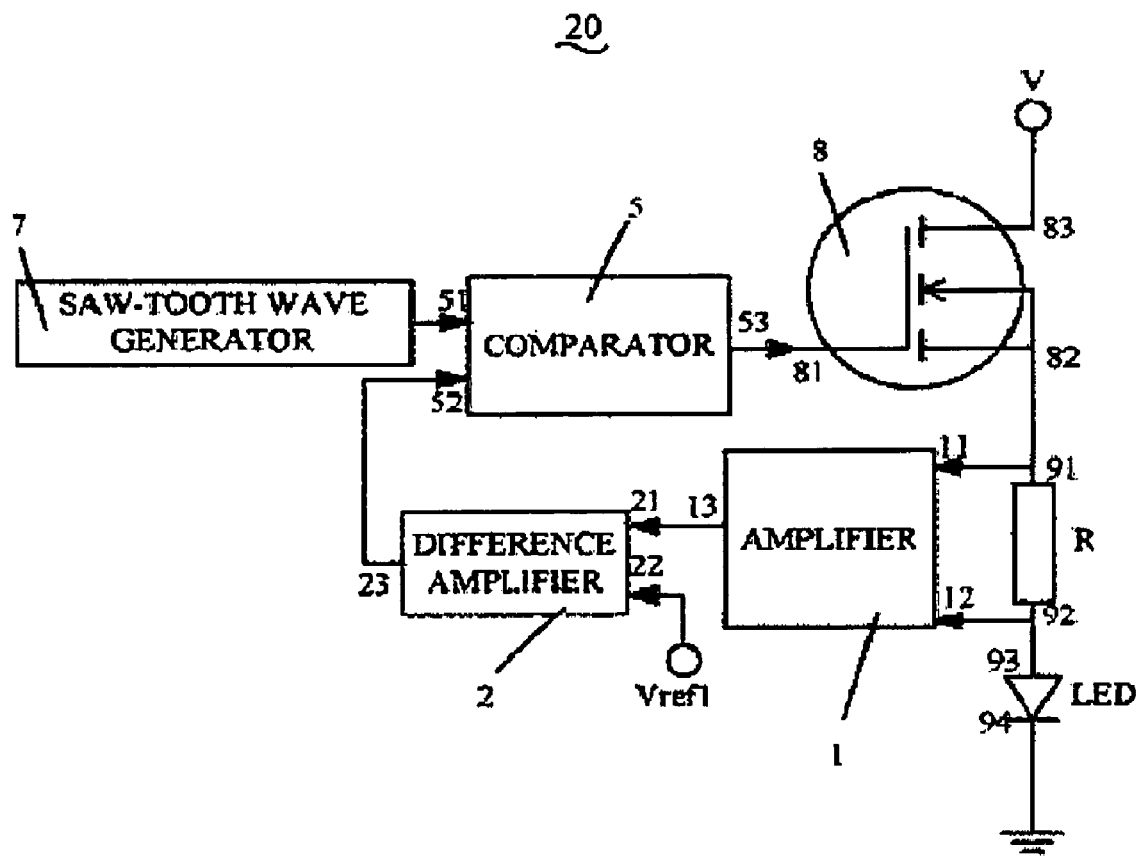
FIG. 2 is a schematic view of a driving circuit for light-emitting diode, in accordance with a second embodiment of the present invention.

Referring to FIG. 2, a driving circuit 20 for an LED in accordance with a second embodiment is shown. The driving circuit 20 includes a resistor R connected with the LED, an amplifier 1, a difference amplifier 2, a comparator 5, a saw-tooth wave generator 7, and a field-effect transistor 8.

The LED has a positive terminal 93 and a negative terminal 94. The field-effect transistor 8 includes a gate electrode 81, a source electrode 82, and a drain electrode 83. The resistor R includes a first terminal 91 and a second terminal 92, the second terminal 92 being connected to the positive terminal 93 of the LED and the first terminal 91 being connected to the source electrode 82 of the field-effect transistor 8. The drain electrode 83 of the field-effect transistor 8 is connected to a positive voltage V. The negative terminal 94 of the LED is connected to ground.

The amplifier 1 is an integrated operational amplifier and is configured for amplifying a voltage across the resistor R. The amplifier 1 includes first input terminal 11, second input terminal 12, and an output terminal 13. The first input terminal 11 is connected to the first terminal 91 of the resistor R and the second terminal 12 is connected to the second terminal 92 of the resistor R.

The difference amplifier 2 includes first input terminal 21, second input terminal 22, and an output terminal 23. The first input terminal 21 is connected to the output terminal 13 of the amplifier 1 and the second input terminal 22 is connected to a first reference voltage Vref1, such as, for example, a voltage signal. The difference amplifier 2 is configured for performing a differential operation between a voltage of the amplifier 1 and the first reference voltage Vref1, and a resulting differential voltage is output to the comparator 5 via the output terminal 23.

The comparator 5 includes first input terminal 51, second input terminal 52, and an output terminal 53. The second input terminal 52 is connected to the output terminal 23 of the difference amplifier 2 and the first input terminal 51 is connected to the saw-tooth wave generator 7. The differential voltage output by the difference amplifier 2 is pulse-width modulated by a saw-tooth wave generated by the saw-tooth wave generator 7 in the comparator 5 and then the comparator 5 generates a pulse-width modulation signal, i.e. a pulse signal.

The pulse-width modulation signal as a control signal is output to the gate electrode 81 of the field-effect transistor 8 via the output terminal 53. The pulse-width modulation signal controls activation and deactivation of the field-effect transistor 8. The result is that a current through the LED is changeable. The field-effect transistor 8 is an N-P-N type transistor.

When the voltage of the resistor R increases, the current through the LED increases, the result is that the difference amplifier 2 outputs a large amplitude voltage signal. Therefore, the comparator 5 generates a small duty-cycle pulse signal to control the N-P-N type field-effect transistor 8. The result is that the current through the LED decreases. Thus, the current through the LED is adjusted.

Although the present invention has been described with reference to specific embodiments, it should be noted that the described embodiments are not necessarily exclusive, and that various changes and modifications may be made to the described embodiments without departing from the scope of the invention as defined by the appended claims.

What is claimed is:

1. A driving circuit for a light-emitting diode having a positive terminal and a negative terminal, comprising:
   a resistor having a first terminal and a second terminal, the second terminal being connected to the positive terminal of the light-emitting diode;
   a field-effect transistor having a source electrode, a drain electrode, and a gate electrode, the source electrode being connected to the first terminal of the resistor;
   a voltage source defined between the drain electrode and the negative terminal of the light-emitting diode; and
   a pulse-width modulation circuit configured for modulating a voltage across the resistor so as to control the gate electrode of the field-effect transistor.

2. The driving circuit as claimed in claim 1, wherein the pulse-width modulation circuit comprises an amplifier having two input terminals, an integrator, a saw-tooth wave generator having one output terminal, and a comparator having first and second input terminals and an output terminal, the amplifier, the integrator, the saw-tooth wave generator and the comparator being connected in series, the input terminals of the amplifier being respectively connected to the first and second terminals of the resistor, the output terminal of the saw-tooth wave generator being connected to the second input terminal of the comparator, the first input terminal of the comparator being connected to a reference voltage, and the output terminal of the comparator being connected to the gate electrode of the field-effect transistor.

3. The driving circuit as claimed in claim 2, wherein the pulse-width modulation circuit further comprises a difference amplifier connected between the amplifier and the integrator, the difference amplifier being configured for performing a differential operation on a voltage of the amplifier and outputting a result thereof to the integrator.

4. The driving circuit as claimed in claim 2, wherein a value of the reference voltage is constant.

5. The driving circuit as claimed in claim 2, wherein the field-effect transistor is a P-N-P type transistor.

6. The driving circuit as claimed in claim 2, wherein the amplifier is an integrated operational amplifier.

7. The driving circuit as claimed in claim 2, wherein the negative terminal of the light-emitting diode is grounded.

8. The driving circuit as claimed in claim 1, wherein the pulse-width modulation circuit comprises an amplifier having two input terminals and an output terminal, a saw-tooth wave generator, and a comparator having a first input terminal, a second input terminal and an output terminal, the first and second input terminals of the amplifier being respectively connected to the first and second terminals of the resistor, the output terminal of the amplifier being connected to the second input terminal of the comparator, the first input terminal of the comparator being connected to the saw-tooth wave generator, and the output terminal of the comparator being connected to the gate electrode of the field-effect transistor.

9. The driving circuit as claimed in claim 8, wherein the pulse-width modulation circuit further comprises a difference amplifier connected between the amplifier and the comparator, the difference amplifier being configured for performing a differential operation between a voltage of the amplifier and a reference voltage and outputting a result thereof to the second input terminal of the comparator.

10. The driving circuit as claimed in claim 8, wherein the field-effect transistor is an N-P-N type transistor.

11. The driving circuit as claimed in claim 8, wherein the amplifier is an integrated operational amplifier.

12. The driving circuit as claimed in claim 8, wherein the negative terminal of the light-emitting diode is grounded.

13. A driving circuit, comprising:
   a light-emitting diode having a positive terminal and a negative terminal, a resistor having a first terminal and a second terminal, the second terminal being connected to the positive terminal of the light-emitting diode;

a field-effect transistor having a source electrode, a drain electrode, and a gate electrode, the source electrode being connected to the first terminal of the resistor;

a voltage source defined between the drain electrode of the field-effect transistor and the negative terminal of the light-emitting diode; and a pulse-width modulation circuit configured for modulating a voltage across the resistor so as to control the gate electrode of the field-effect transistor.

14. The driving circuit as claimed in claim 13, wherein the pulse-width modulation circuit comprises an amplifier having two input terminals, an integrator, a saw-tooth wave generator having one output terminal, and a comparator having first and second input terminals and an output terminal, the amplifier, the integrator, the saw-tooth wave generator and the comparator being connected in series, the input terminals of the amplifier being respectively connected to the first and second terminals of the resistor, the output terminal of the saw-tooth wave generator being connected to the second input terminal of the comparator, the first input terminal of the comparator being connected to a reference voltage, and the output terminal of the comparator being connected to the gate electrode of the field-effect transistor.

15. The driving circuit as claimed in claim 14, wherein the pulse-width modulation circuit further comprises a difference amplifier connected between the amplifier and the integrator, the difference amplifier being configured for performing a differential operation on a voltage of the amplifier and outputting a result thereof to the integrator.

16. The driving circuit as claimed in claim 14, wherein the amplifier is an integrated operational amplifier.

17. The driving circuit as claimed in claim 14, wherein the negative terminal of the light-emitting diode is grounded.

18. The driving circuit as claimed in claim 13, wherein the pulse-width modulation circuit comprises an amplifier having two input terminals and an output terminal, a saw-tooth wave generator, and a comparator having a first input terminal, a second input terminal and an output terminal, the first and second input terminals of the amplifier being respectively connected to the first and second terminals of the resistor, the output terminal of the amplifier being connected to the second input terminal of the comparator, the first input terminal of the comparator being connected to the saw-tooth wave generator, and the output terminal of the comparator being connected to the gate electrode of the field-effect transistor.

19. The driving circuit as claimed in claim 18, wherein the pulse-width modulation circuit further comprises a difference amplifier connected between the amplifier and the comparator, the difference amplifier being configured for performing a differential operation between a voltage of the amplifier and a reference voltage and outputting a result thereof to the second input terminal of the comparator.

20. The driving circuit as claimed in claim 18, wherein the negative terminal of the light-emitting diode is grounded.

* * * * *